United States Patent
Ishizaka et al.

(10) Patent No.: US 6,647,398 B1
(45) Date of Patent: *Nov. 11, 2003

(54) DATA MANAGING METHOD AND APPARATUS, AND RECORDING MEDIUM

(75) Inventors: Takashi Ishizaka; Takayuki Ooi; Yasuo Ohtomo; Ayako Ohtomo; Shingo Ooya; Tsutomu Kageyama, all of Tokyo (JP)

(73) Assignee: Beacon Information Technology Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,308

(22) Filed: Mar. 24, 2000

(30) Foreign Application Priority Data

Apr. 1, 1999 (JP) .......................................... 11-094531

(51) Int. Cl.[7] .............................................. G06F 17/30
(52) U.S. Cl. ...................................................... 707/203
(58) Field of Search ......................................... 707/203

(56) References Cited

U.S. PATENT DOCUMENTS

| | | | | |
|---|---|---|---|---|
| 3,830,964 A | * | 8/1974 | Spencer .................. | 358/426.13 |
| 4,479,180 A | * | 10/1984 | Miller et al. ................. | 711/157 |
| 4,819,156 A | * | 4/1989 | Delorme et al. ............ | 714/156 |
| 5,095,420 A | * | 3/1992 | Eilert et al. ................. | 711/209 |
| 5,483,498 A | * | 1/1996 | Hotta ....................... | 365/233.5 |
| 5,493,668 A | * | 2/1996 | Elko et al. .................. | 711/130 |
| 5,592,661 A | | 1/1997 | Eisenberg et al. | |
| 5,745,906 A | * | 4/1998 | Squibb ....................... | 707/203 |
| 5,864,849 A | * | 1/1999 | Bohannon et al. ............. | 707/8 |
| 5,899,988 A | * | 5/1999 | Depledge et al. .............. | 707/3 |
| 6,014,693 A | * | 1/2000 | Ito et al. .................... | 709/219 |
| 6,189,083 B1 | * | 2/2001 | Snyder, II ................... | 711/213 |

FOREIGN PATENT DOCUMENTS

| | | |
|---|---|---|
| CA | 2285089 | 5/1993 |
| CA | 2285096 | 5/1993 |

* cited by examiner

*Primary Examiner*—Wayne Amsbury
(74) *Attorney, Agent, or Firm*—Bachman & LaPointe, P.C.

(57) ABSTRACT

A data managing apparatus includes a data file storing records each including data units corresponding to predetermined items, and an index file corresponding to a certain item which requires data arrangement in a predetermined sequence and storing change bits each corresponding to one of the records stored in the data file and each representing whether data has been changed between the adjacent records with respect to the corresponding item. When a retrieval request is received from an operator about the foregoing certain item, the change bits are read from the index file following a retrieval start position and a retrieval direction designated by the retrieval request, so that a requested record is identified based on the read change bits. Then, data units of the identified record are read from the data file and notified to the operator via a display device or the like.

9 Claims, 7 Drawing Sheets

| RECORD NUMBER | ITEM a | ITEM b | ITEM c | ITEM d |
|---|---|---|---|---|
| 1 | Da1 | Db1 | Dc1 | Dd1 |
| 2 | Da2 | Db2 | Dc2 | Dd2 |
| 3 | Da3 | Db3 | Dc3 | Dd3 |
| ⋮ | ⋮ | ⋮ | ⋮ | ⋮ |
| n | Dan | Dbn | Dcn | Ddn |

| RECORD NUMBER | CHANGE BIT |
|---|---|
| 1 | Bb1 |
| 2 | Bb2 |
| 3 | Bb3 |
| ⋮ | ⋮ |
| n | Bbn |

| RECORD NUMBER | NAME | WORKING SECTION | -------- |
|---|---|---|---|
| 1 | A | SALES SECTION 1 | |
| ⋮ | ⋮ | ⋮ | |
| 10 | A | SALES SECTION 1 | |
| 11 | A | SALES SECTION 2 | |
| 12 | A | SALES SECTION 2 | |
| 13 | A | SALES SECTION 2 | |
| 14 | A | SALES SECTION2 | |
| 15 | A | SALES SECTION 2 | |
| 16 | A | SALES SECTION 2 | |
| 17 | A | SALES SECTION 3 | |
| 18 | A | SALES SECTION 3 | |
| 19 | A | SALES SECTION 3 | |
| 20 | A | SALES SECTION 3 | |

Fig.7

| RECORD NUMBER | CHANGE BIT |
|---|---|
| 1 | 1 |
| ⋮ | ⋮ |
| 10 | 0 |
| 11 | 1 |
| 12 | 0 |
| 13 | 0 |
| 14 | 0 |
| 15 | 0 |
| 16 | 0 |
| 17 | 1 |
| 18 | 0 |
| 19 | 0 |
| 20 | 0 |

RECORD NUMBER IDENTIFIED AT STEP S12

DATA MANAGING METHOD AND APPARATUS, AND RECORDING MEDIUM

BACKGROUND OF THE INVENTION

1. Field of the Invention

The present invention relates to an improved data managing technique for managing data units which are subject to a predetermined order or sequence, such as data units whose contents are changed with a lapse of time, so as to enable a high-speed retrieval of such a data unit corresponding to a time point of an occurrence of change in contents, from among the data units.

2. Description of the Related Art

There has been known a data managing technique for managing data units subject to a predetermined sequence so as to provide a logical data structure which meets a user's requirement. For example, it has been popularized in business enterprises to manage data of all the employees using a data managing apparatus in the form of a computer. The employees' data is composed of records each including data units on those items, such as name, sex, address, date of birth, working section and title of an employee. It is normal that each record is changed in contents with a lapse of time. As the cause of change, change in address, change in working section, promotion or the like may be cited.

When a record is changed in contents, it is preferable that the new contents are stored in addition to the old contents rather than merely replacing the old contents with the new contents, so that a record at a desired past time can be obtained upon request. In view of this, in the conventional technique, record storage locations are arranged in time sequence for storing records in turn, and a required record is read from the corresponding record storage location upon request.

When it is necessary to check whether data on a particular item of a certain employee has been changed, comparison is made between adjacent data units on that particular item stored in time sequence so as to judge whether a data change has been caused.

If a record to be checked is identified, an occurrence of data change is judged by comparing a data unit on the particular item of that record and a data unit on the particular item of a record stored adjacently thereto in time sequence. On the other hand, if a record to be checked is not identified, it is necessary to retrieve and read data units on the particular item with respect to all the records of the certain employee, and compare them between the adjacent records in turn.

For example, for retrieving a record at a time point when data on item "title" of a certain employee was changed to "manager". it is necessary to check data units on item "title" in employee data of that employee in time sequence. thereby to identify the record which first stores "manager". Accordingly, in such a retrieval operation, it is necessary to compare records in turn in time sequence and identify a record which first stores objective data. This is required because, for example, if data on item "address" is changed after the title is changed to "manager", a new record is added so that there exist a plurality of records in which the title is "manager". Thus, without comparing in turn the records in time sequence and identifying the record which first stores the objective data, there is a possibility that a record subsequent to a record which first stores "manager" is retrieved.

Accordingly, when the employees' data is large in amount or the number of records included in the employee data of each employee is large, the retrieval time is prolonged. The number of records may be increased as the number of items constituting a record Is increased.

As appreciated from the foregoing description, in the employees' data managed by the data managing apparatus, a plurality of items, i.e. a plurality of data units on those items, are handled as one unit. i.e. per record, so that actual recording or reading of data is performed per record. Therefore, for example, even if a user wishes to only obtain a data unit of a certain record with respect to a particular item, not only the data unit on the particular item but also data units on the other items are simultaneously read. Thus, as the number of items is increased, it takes more time to read one record, thereby to prolong the read time for such data that is unnecessary for a retrieval process.

As described above, owing to the retrieval process following the sequence of data and the recording and reading of data per record, the time unnecessary for the retrieval process is prolonged as the number of records or items is increased, which may spoil the practicality of the conventional data managing apparatus.

SUMMARY OF THE INVENTION

Therefore, it is an object of the present invention to provide an improved data managing method which can solve one or more of the foregoing problems.

It is another object of the present invention to provide an improved data managing apparatus which can solve one or more of the foregoing problems.

It is another object of the present invention to provide a recording medium for realizing the foregoing improved data managing method or apparatus using a computer.

According to one aspect of the present invention, there is provided a data managing method for storing and reading data units subject to a predetermined sequence, the method comprising a recording step of comparing, every time a data unit is inputted, the inputted data unit with a data unit stored immediately before, and storing a change bit associated with the inputted data unit, the change bit set to a different value between cases when both data units are the same with each other and when both data units differ from each other: and a retrieval step of referring to the change bits to identify a change point in values thereof, and retrieving a data unit corresponding to the change bit at the identified change point as a data unit whose contents have been changed.

It may be arranged that the retrieval step checks the change bits in a predetermined retrieval direction and, when the change bit represents that both data units are the same with each other, the retrieval step ignores such a change bit.

It may be arranged that the retrieval step comprises a step of reading the change bits per given number for detecting whether the change point exists therein.

According to another aspect of the present invention, there is provided a data managing apparatus comprising a data file for storing records each of which includes at least one item for a corresponding data unit, the data units subject to a predetermined sequence: an index file associated with the item: and record control means for controlling storing into the data file and the index file, wherein, responsive to a request for recording a data unit with respect to the item, the record control means produces a new record including the requested data unit and stores the new record into the data file, and further stores a change bit into the index file, the change bit representing whether the requested data unit in the new record differs from a data unit stored immediately before with respect to the item.

According to another aspect of the present invention, there is provided a data managing apparatus comprising a data file storing records each of which includes at least one item having a corresponding data unit, the data units subject to a predetermined sequence: an index file associated with the item and storing change bits representing whether the data units of the item have been changed In the predetermined sequence: and read control means for controlling reading from the data file and the index file, wherein, responsive to a retrieval request for a record whose data unit with respect to the item has been changed in contents, the read control means identifies the requested record based on the change bits stored in the index file.

It may be arranged that the data managing apparatus further comprises means for defining a relationship between information units for identifying the records stored in the data file and time information units, wherein one of the records is identified based on corresponding one of the time information units.

According to another aspect of the present invention, there is provided a computer-readable recording medium storing a program which causes a computer to execute the steps of forming a data file for storing records each of which includes at least one item for a corresponding data unit. the data units subject to a predetermined sequence; forming an index file associated with the item; producing, responsive to a request for recording a data unit with respect to the item, a new record including the requested data unit; storing the new record into the data file: and storing a change bit into the index file, the change bit representing whether the requested data unit in the new record differs from a data unit stored immediately before with respect to the item.

According to another aspect of the present invention, there is provided a computer-readable recording medium storing a program which causes a computer to execute the steps of forming a data file storing records each of which includes at least one item having a corresponding data unit, the data units subject to a predetermined sequence; forming an index file associated with the item and storing change bits representing whether the data units of the item have been changed in the predetermined sequence; referring, responsive to a retrieval request for a record whose data unit with respect to the item has been changed in contents, to the change bits stored in the index file; and identifying the requested record based on the referred change bits.

BRIEF DESCRIPTION OF THE DRAWINGS

The present invention will be understood more fully from the detailed description given hereinbelow, taken in conjunction with the accompanying drawings.

In the drawings:

FIG. 6 is a diagram showing an example of a data file stored in the storage of the data managing apparatus shown in FIG. 1;

FIG. 7 is a diagram showing an example of an index file stored in the storage of the data managing apparatus shown in FIG. 1.

DESCRIPTION OF THE PREFERRED EMBODIMENT

Now, a preferred embodiment of the present invention will be described hereinbelow with reference to the accompanying drawings.

Figure 1:
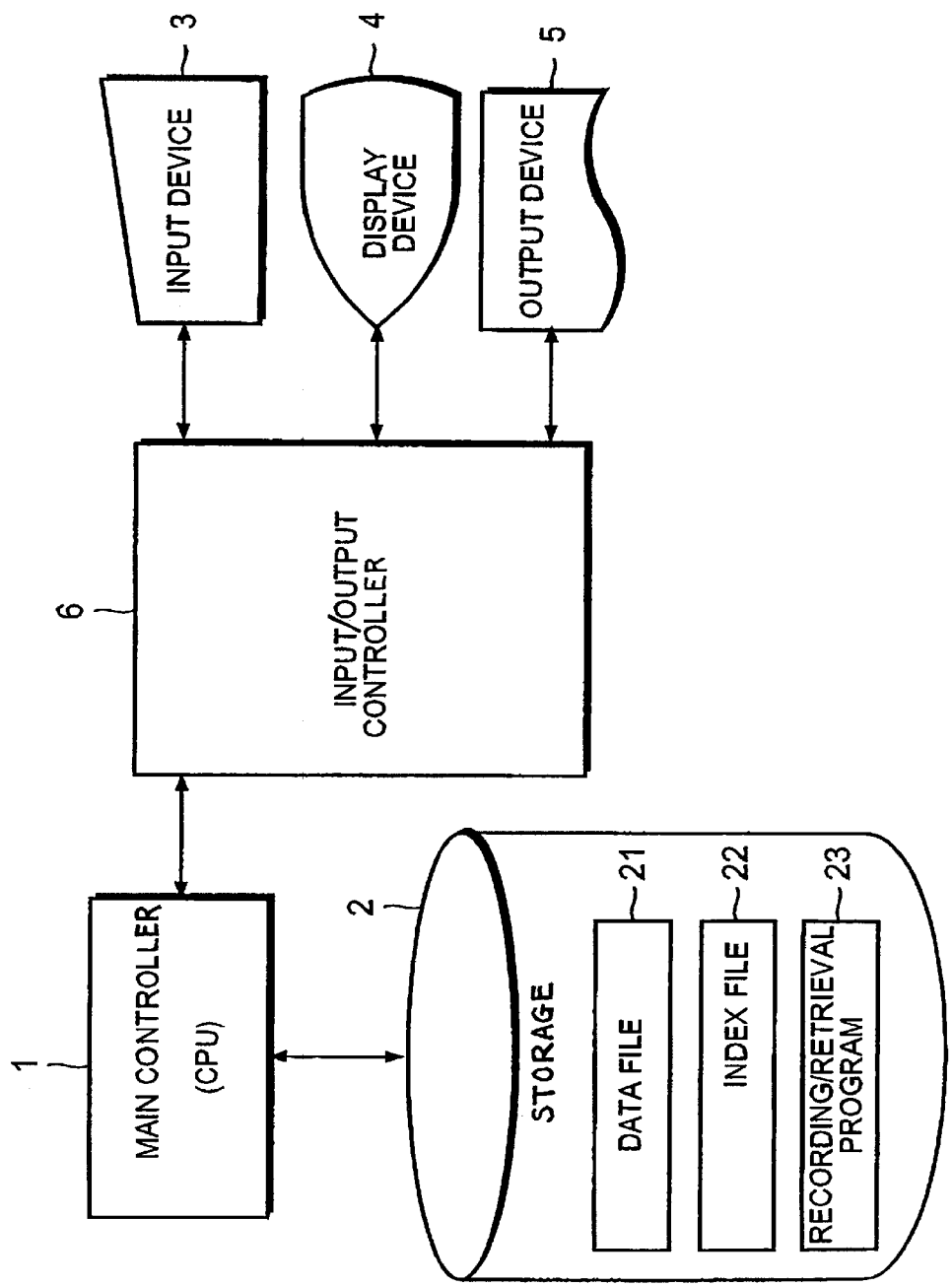
FIG. 1 is a block diagram showing a hardware structure of a data managing apparatus according to a preferred embodiment of the present invention.

FIG. 1 shows a hardware structure of a data managing apparatus according to the preferred embodiment of the present invention.

The data managing apparatus comprises a main controller (CPU; central processing unit) 1 for controlling an operation of the whole apparatus, a storage 2 connected to the CPU 1, an input device 3 for Inputting a request from an operator, a display device 4 for displaying input or output data, an output device 5 for outputting read data to the exterior of the data managing apparatus, and an input/output controller 6 for controlling input and output of data among the CPU 1, the input device 3, the display device 4 and the output device 5.

The CPU 1 reads a control program and an application program for executing a given control and process.

The storage 2 is a fixed-type storage in the form of a magnetic storage such as a hard disk, or a semiconductor storage such as a RAM (random access memory), and stores therein various files and program codes. In this embodiment. the storage 2 stores therein a data file 21, an index file 22, a recording/retrieval program 23 and a control program. These files and programs may be recorded in a portable recording medium, such as a flexible disk. optical disk, magnet-optical disk. CD-ROM, CD-R, DVD or magnetic tape, in a manner readable by the CPU 1, or may be installed into the storage 2 from another apparatus via a communication means not shown. Details of the data file 21 and the index file 22 will be described later.

The recording/retrieval program 23 serves to form a data recording module for implementing a data recording process and a data retrieval module for Implementing a data retrieval process.

It may be arranged that the control program executes part of a process based on commands from the recording/retrieval program 23 so that the foregoing modules are formed through the process, or that the foregoing modules are formed through cooperation between the recording/retrieval program 23 and another application. For brevity of description, explanation will be made assuming that the foregoing modules are formed only by the recording/retrieval program 23.

The input device 3 comprises a keyboard and a mouse, and receives a data recording request or a data retrieval request from an operator. The display device 4 is in the form of a CRT (cathode ray tube) or FPD (flat panel display), and displays the contents of a data retrieval request or a process result on the data retrieval request. The output device 5 is in the form of a printer or the like, and outputs the process result to the exterior through printing or the like. The input/output controller 6 notifies the data recording or retrieval request received at the input device 3 to the CPU 1, displays it on the display device 4. and sends the process result to the display device 4 or the output device 5 according to a request received at the input device 3.

Now, the data file 21 and the index file 22 will be described.

<Data File>

Figure 2:
FIG. 2 is a diagram showing an example of a data file stored in a storage of the data managing apparatus shown in FIG. 1.

FIG. 2 shows an example of the contents of the data file 21. The data file 21 is a file for storing various kinds of data subject to a predetermined order or sequence, per unit of a record. Each record is composed of data units corresponding to predetermined items. In the example of FIG. 2, a record identified by record number "3", for example, is composed of a data unit Da3 corresponding to item "a", a data unit Db3 corresponding to item "b", a data unit Dc3 corresponding to item "c", and a data unit Dd3 corresponding to item "d".

In items "a" to "d", data units corresponding to at least one of those items are stored following a predetermined sequence. As the predetermined sequence, a time sequence in order of older data units or newer data units may be cited. As data stored in time sequence. the foregoing employees' data may be cited. Upon very occurrence of updating data, a new record is produced. Thus, "n" records from a record #1 to a record #n are stored in the data file 21. As appreciated, in case of the employees' data. the data file 2 is provided per employee.

<Index File>

Figure 3:
FIG. 3 is a diagram showing an example of an Index file stored in the storage of the data managing apparatus shown in FIG. 1.

FIG. 3 shows an example of the contents of the index file 22. The index file 22 is a file for recording or retrieving a time point of change in contents of data stored in the data file 21 following the predetermined sequence.

The index file 22 shown in FIG. 3 corresponds to item "b" as an example. The index file 22 stores a change bit per record, wherein the change bit represents whether a newly stored data unit and a data unit stored immediately before the newly stored data unit in the predetermined sequence differ from each other or not. Specifically, the change bit represents presence or absence of a change point in a predetermined sequence of data units on a corresponding item.

Since the change bit is only required to show presence or absence of a change point, it is sufficient for the change bit to have a data volume of at least one bit. Thus, in the example shown in FIG. 3, one bit is used for the change bit. For example, a change bit Bb3 corresponding to a record #3 is set to "1" when a data unit Db3 corresponding to item "b" in the record #3 differs from a data unit Db2 corresponding to item "b" in a record #2, while it is set to "0" when they are the same with each other.

On the other hand, a change bit corresponding to a record #1 is set to "1" as a default value since the record #1 is the first or initial record in the data file 21.

The index file 22 is provided per Item. Accordingly, for example, if data on items "b" and "c" are stored following the predetermined sequence, index files are provided for items "b" and "c", respectively.

<Data Recording>

Figure 4:
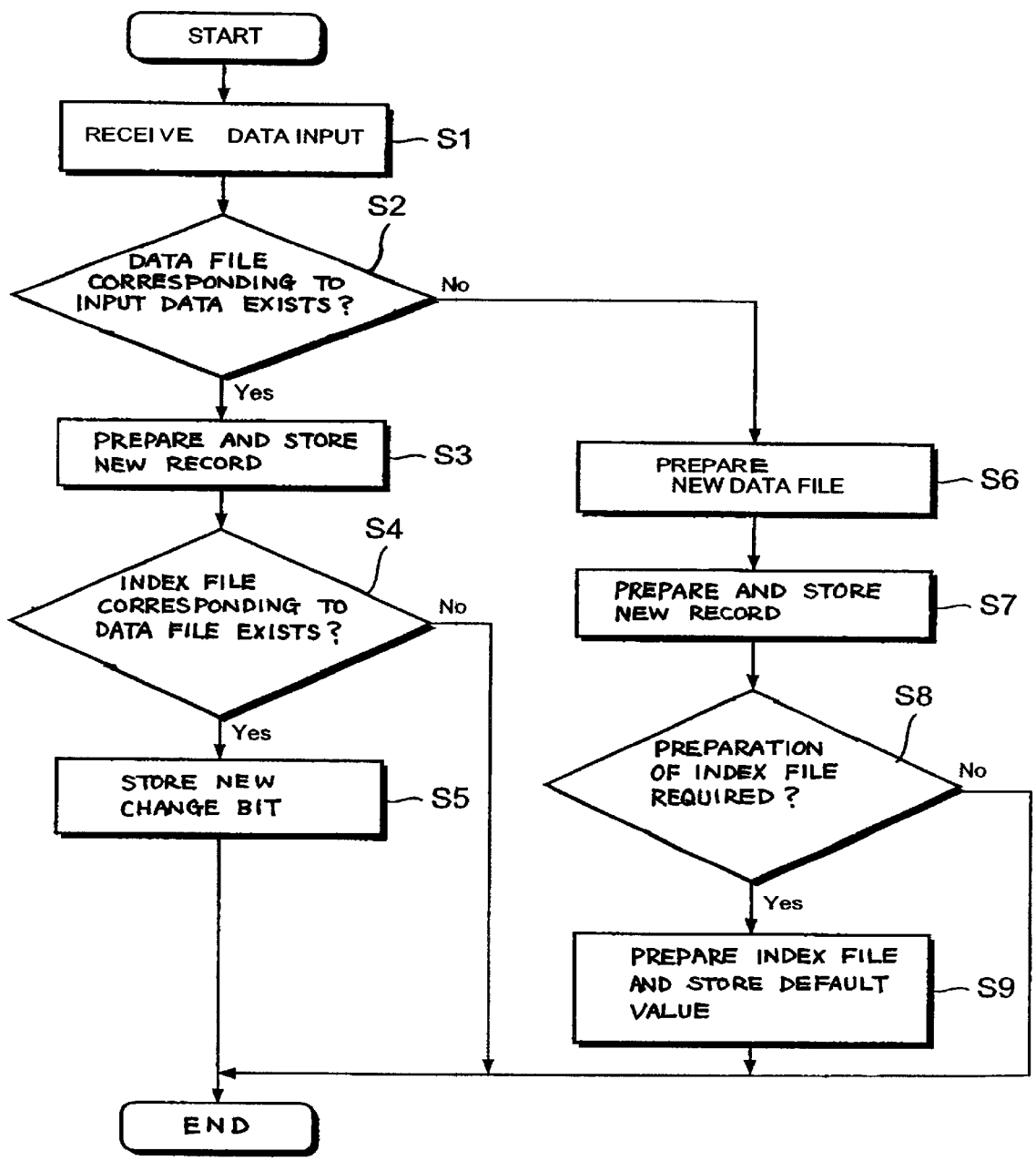
FIG. 4 is a flowchart showing a procedure of a data recording process according to the preferred embodiment of the present invention.

Referring now to FIG. 4, the data recording process in this embodiment will be described. This process is executed by the foregoing data recording module.

When a data unit is inputted by an operator via the input device 3, the inputted data unit is sent to the data recording module via the input/output controller 6 (step SI). The data recording module judges whether there exists a data file 21 corresponding to the inputted data unit in the storage 2 (step S2). For example, when the inputted data unit relates to a certain employee, it is judged whether there exists a data file corresponding to that employee, or, when the inputted data unit relates to a certain working location, it is judged whether there exists a data file corresponding to that working location.

If there exists the corresponding data file 21, a new record is produced and stored In the data file 21 (step S3). The new record includes the inputted data unit. With respect to those items other than the item corresponding to the inputted data unit, the last data units are stored as they are in the new record. The new record is assigned a record number derived by adding "1" to the last record number, and stored in the data file 21 as the newest record.

Then, it is Judged whether there exists an index file 22 corresponding to the data file 21 in the storage 2 (step S4).

If positive (Yes at step S4), the data unit stored at step S3 is compared with a data unit stored immediately before with respect to the item corresponding to the index file 22. Then, a new change bit is set to "1" when both data units differ from each other, while it is set to "0" when both data units are the same with each other. The new change bit is stored in the index file 22 associated with the new record number assigned at step S3 (step S5).

When there are a plurality of index files 22 corresponding to different items, respectively, data units are compared with each other per item. After storing the new change bit, the data recording process is finished. If no index file 22 exists corresponding to the data file (No at step S4), the data recording process is finished without storing a new change bit.

On the other hand, if no data file 21 exists corresponding to the inputted data unit (No at step S2), a new data file is produced for storing the inputted data unit (step S6). The new data file may be produced by notifying the operator that no corresponding data file exists in the storage 2, and requesting the operator to input a command for producing a new data file. When the new data file 21 is produced, a record including the inputted data unit Is produced and stored in the data file 21 as the first record. Since this is the first record, record number "1" is assigned thereto (step S7). Then, it is judged per item whether it is necessary to produce an index file 22 (step S8). It may be arranged to request the operator to input a command upon producing the record at step S7 and, after producing and storing the record according to the operator's command, to confirm the operator per item about necessity for producing an index file.

If one or more index files 22 are produced, a change bit of "1" is stored as a default value corresponding to record number "1" in one or more index files 22 (step S9). After storing the change bit, the data recording process is finished. If no index file 22 is required for the data file 21 (No at step S8), the data recording process is finished.

<Retrieval of Change Point>

Now, the retrieval process for detecting changed data (record) in this embodiment will be described.

Figure 5:
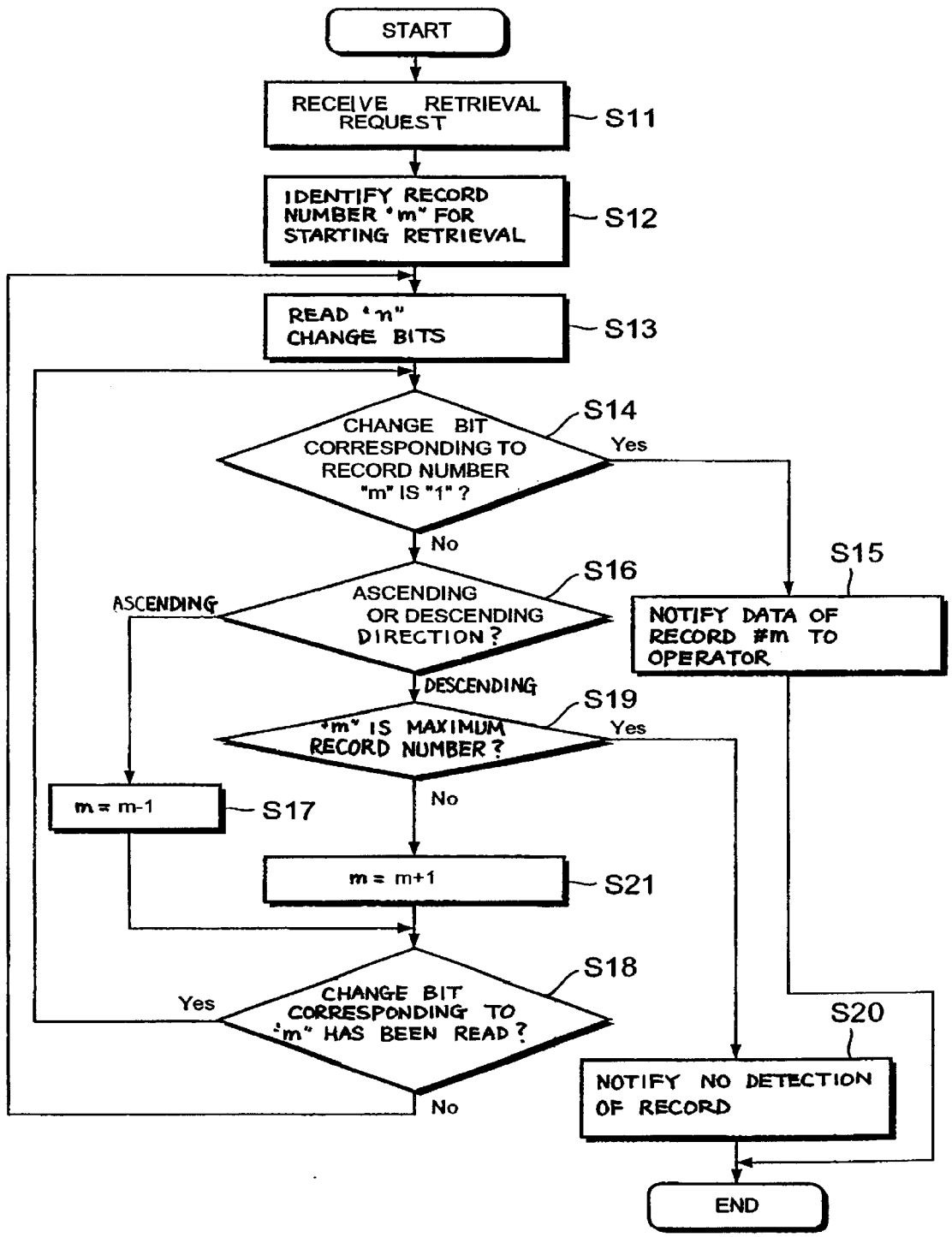
FIG. 5 is a flowchart showing a procedure of a change point retrieval process according to the preferred embodiment of the present Invention.

The flow of the retrieval process will be first described with reference to FIG. 5, then a concrete operation will be described with reference to FIG. 6 showing an example of the data file 21 and FIG. 7 showing an example of the index file 22. It is assumed that the recording/retrieval program 23 is executed by the CPU 1 so that the foregoing data retrieval module is formed.

When a retrieval request from the operator is received at the input device 3, the retrieval request Is sent via the input/output controller 6 to a region where the data retrieval module can read it (step S11). The retrieval request from the operator includes a data file to be retrieved, an item to be retrieved, retrieval target data, a retrieval start position (time) and a retrieval direction. A retrieval range may also be designated if necessary.

After receipt of the retrieval request, the data retrieval module identifies record number "m" from which a retrieval is started. based on the retrieval start position designated by the operator (step S12). For example, there is a case wherein the retrieval start position is designated by the operator using not a record number but a date such as "Feb. 3, 1980". In this case, the data retrieval module refers to a table or the like prestored in the storage 2 for defining a relationship between dates and record numbers, thereby to identify record number "m".

When record number "m" is identified, "n" change bits of an index file 22 ("n" is a preset number) corresponding to the item designated by the operator at step S11 are read starting from a change bit corresponding to record number "m" in the retrieval direction designated by the operator at step S11 (step S13).

Then, the data retrieval module checks whether the change bit corresponding to record number "m" among the read "n" change bits is "1" (step S14). If positive (Yes at step S14), data units included in a record #m are notified to the operator as a retrieval result (step S15). Then, the retrieval process is finished.

If the change bit corresponding to record number "m" is not "1" (No at step S14), it is checked whether the retrieval direction designated by the operator is an ascending direction or a descending direction (step S16). If the retrieval direction is the ascending direction, "1" is subtracted from record number "m", and a change bit corresponding to a record number after subtraction is referred to (steps S17 and S18).

If the change bit corresponding to the record number after subtraction has been read (Yes at step S18), the process returns to step S14 where it is Judged whether the change bit is "1". If not read yet (No at step S18), the process returns to step S13 where subsequent "n" change bits in the ascending direction are read.

If the retrieval direction is the descending direction at step S16, it is Judged whether record number "m" is a maximum record number stored in the index file 22, i.e. the data file 21 (step S19). If positive (Yes at step S19). it is notified to the operator via the display device 4 or the output device 5 that the descending direction retrieval has been carried out to the last record, but the record requested by the operator has not been detected (step S20). Then, the retrieval process is finished.

If record number "m" is not the maximum record number stored in the index file 22 (No at step S19), "1" is added to record number "m" (step S21), then it is judged whether a change bit corresponding to the record number after addition has been read (step S18). Since the subsequent process is the same as that in the ascending direction, explanation thereof is omitted.

Through the foregoing retrieval process, the record requested by the operator can be quickly retrieved. Particularly, since the change bits stored in the index file 22 are read, It is not necessary to read and compare data units of the records corresponding to the item to be retrieved. This enables the high-speed retrieval process. Further, since not all the change bits in the index file 22 are read, but the change bits are read per "n" change bits, it is possible to avoid reading unnecessary change bits.

<Concrete Example of Retrieval Process>

Now, concrete examples of the retrieval process will be described with reference to the data file 21 shown in FIG. 6 and the index file 22 shown in FIG. 7.

In the data file 21 shown in FIG. 6, various data about an employee A are stored. The index file 22 shown in FIG. 7 corresponds to item "working section" in the data file 21.

FIRST EXAMPLE

In this example, it is assumed that a retrieval request is for retrieving a record in the data file 21 when the employee A was assigned to "sales section 2". It is further assumed that an operator designates as a retrieval start time point an arbitrary time point while the employee A belongs to "sales section 2", and that a record number corresponding to this time point is "13". It is further assumed that the number of change bits read from the index file 22 at a time is set to "3", i.e. "n" is set to "3".

The data managing apparatus receives a retrieval request from the operator and identifies record number "m" for starting a retrieval to be record number "13" (steps S11 and S12). In this example, since the retrieval direction is the ascending direction, three change bits are read in the ascending direction starting from record number "13" (step S13). As seen from FIG. 7, the read bit string is "001". Then, it is judged whether the change bit corresponding to record number "13", i.e. the first change bit in the bit string, is "1" (step S14). Since the change bit corresponding to record number "13" is "0", it is then judged whether the retrieval direction Is the ascending or descending direction (step S16). Since the retrieval direction is the ascending direction as described above, "1" is subtracted from "m" so that record number "m" becomes record number "12" (step S17). Then, the process returns via step S18 to step S14 where it is judged whether the change bit corresponding to record number "12" is "1".

In this example, by repeating execution of steps S14, S16, S17 and S18, it is judged that the change bit corresponding to record number "11" is "1" (Yes at step S14). Then, data units of a record #11 stored in the data file 21 are notified to the operator via the display device 4 or the output device 5 (step S15).

SECOND EXAMPLE

In this example, it is assumed that a retrieval request is for retrieving a record in the data file 21 when the employee A was assigned from "sales section 2" to another section. It is further assumed that an operator designates as a retrieval start time point an arbitrary time point while the employee A belongs to "sales section 2", and that a record number corresponding to this time point is "13". It is further assumed that the number of change bits read from the index file 22 at a time is set to "3", i.e. "n" is set to "3".

The data managing apparatus receives a retrieval request from the operator and identifies record number "m" for starting a retrieval to be record number "13" (steps S11 and S12). In this example, since the retrieval direction is the descending direction, three change bits are read in the descending direction starting from record number "13" (step S13). As seen from FIG. 7, the read bit string is "000".

Then, it is judged whether the change bit corresponding to record number "13", i.e. the first change bit in the bit string, is "1" (step S14). Since the change bit corresponding to record number "13" is "0", it is then Judged whether the retrieval direction is the ascending or descending direction (step S16). Since the retrieval direction is the descending direction as described above, it is judged whether record number "m" is a maximum record number among record numbers stored in the index file 22, i.e. the data file 21 (step S19).

As seen from FIG. 7, since the maximum record number is "20", "1" is added to "m" so that record number "m" becomes record number "14" (No at step S19. step S21). Then, the process returns via step S18 to step S14 where it is judged whether the change bit corresponding to record number "14" is "1".

In this example, after repeating execution of steps S14, S16, S19, S21 and S18 three times, it is known that the first read bit string includes no change bit which is "1". Accordingly, the process returns to step S13 where three change bits are read in the descending direction starting from record number "16".

Then, execution of steps S14, S16, S19, S21 and S18 is repeated. As a result, it is judged that the change bit corresponding to record number "17" is "1" (Yes at step S14), so that data units of a record #17 stored in the data file 21 are notified to the operator via the display device 4 or the output device 5 (step S15).

<Count of the Number of Changes>

Figure 8:
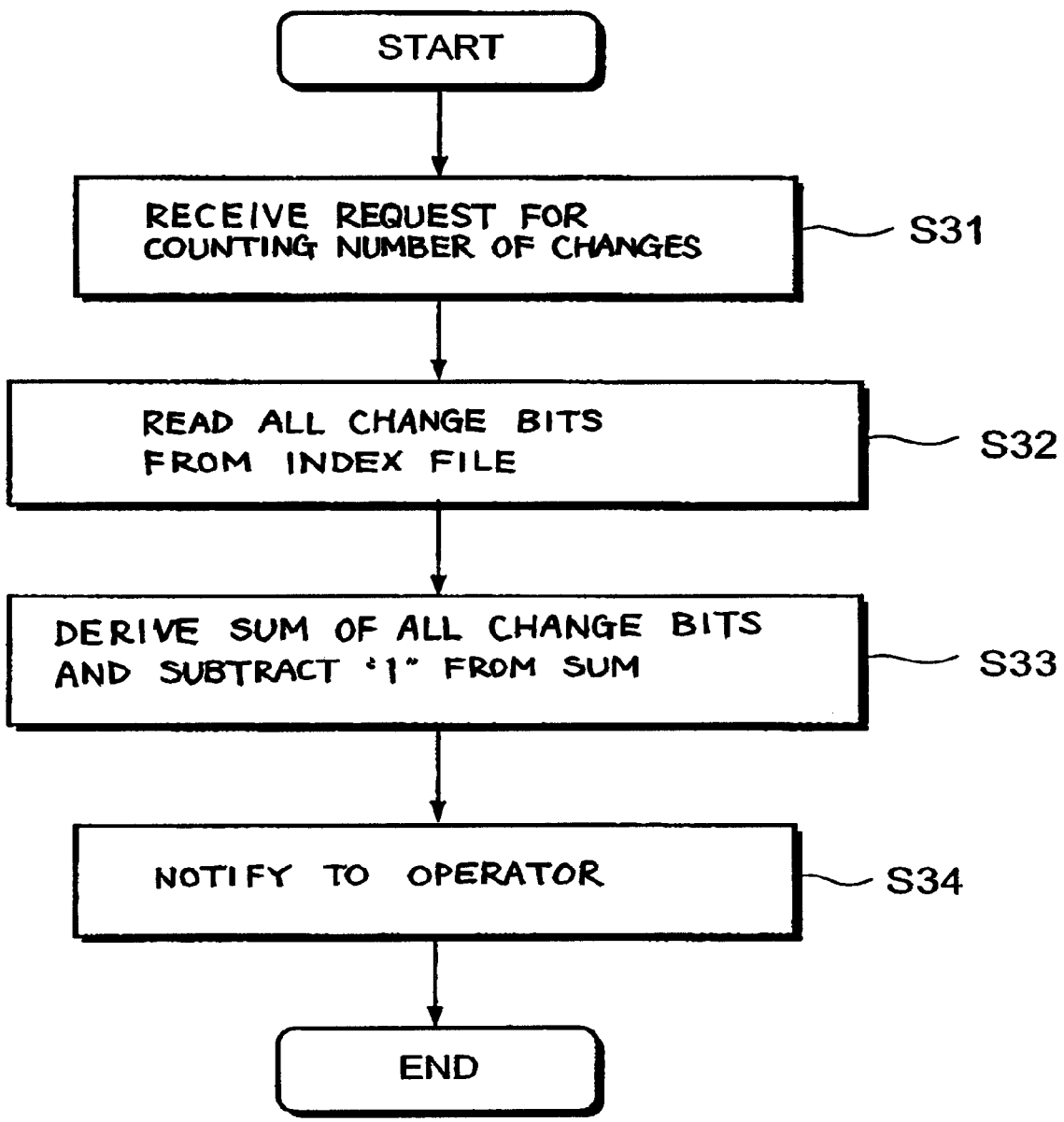
FIG. 8 is a flowchart showing a procedure of a retrieval process for counting the number of times of data changes according to the preferred embodiment of the present invention.

Now, the retrieval process for counting the number of times of data changes in this embodiment will be described with reference to FIG. 8. It is assumed that the recording/retrieval program 23 is executed by the CPU 1 so that the data retrieval module is formed.

When a request is received from an operator for counting the number of times of data changes with respect to a designated item of a data file 21, all the stored change bits are read from an index file 22 corresponding to the designated item (steps S31 and S32). Then, the sum of all the read change bits is derived. Since the change bit corresponding to record number "1" is set to "1" as a default value, "1" is subtracted from the derived sum (step S33). A result of the subtraction is displayed on the display device 4 and thus notified to the operator (step S34).

For example, in case of the index file 22 shown in FIG. 7, "twice" is notified to the operator. When item "address" is provided, the number of times of moving (the number of times of address changes), the number of times of transference. or the like can be known with respect to a certain employee.

As described above, according to the foregoing preferred embodiment of the present invention, in the change point retrieval process or the process for counting the number of times of data changes, it is required to read only the change bits stored in the index file 22 so that it is not necessary to read data per record from the data file 21 and compare them.

Since the change bit stored in the index file 22 has the minimum data volume for showing an occurrence of change, the high-speed retrieval process or counting process can be realized.

In the foregoing preferred embodiment, explanation has been made to the case wherein the data management is carried out for the employees. However, the present invention is also applicable to management of other various kinds of data subject to a predetermined sequence, such as, customer management, production control, patent administration and insurance/annuity management.

In case of the customer management, items may include kind of credit card, history of card acquisition, address, family history and the like. In case of the production control, items may include design change, specification change, maintenance history, production planning/actual yield and the like. In case of the patent administration, items may include history from application to registration. In case of the insurance/annuity management, items may include history of contract contents. history of reserve/ use and the like.

While the present invention has been described in terms of the preferred embodiment, the invention is not to be limited thereto, but can be embodied in various ways without departing from the principle of the invention as defined in the appended claims.

What is claimed is:

1. A data managing method for storing and reading data units subject to a predetermined sequence, said method comprising:

a recording step of comparing, every time a data unit is inputted, the inputted data unit with a data unit stored immediately before, and storing a change bit associated with the inputted data unit, said change bit set to a different value between cases when both data units are the same with each other and when both data units differ from each other; and a retrieval step of referring to the change bits to identify a change point in values thereof, and retrieving a data unit corresponding to the change bit at the identified change point as a data unit whose contents have been changed.

2. The data managing method according to claim 1, wherein said retrieval step checks the change bits In a predetermined retrieval direction and, when the change bit represents that both data units are the same with each other, said retrieval step ignores such a change bit.

3. The data managing method according to claim 1, wherein said retrieval step comprises a step of reading the change bits per given number for detecting whether the change point exists therein.

4. A data managing apparatus comprising:

a data file for storing records each of which includes at least one item for a corresponding data unit, said data units subject to a predetermined sequence;

an index file associated with said item; and record control means for controlling storing into said data file and said index file, wherein, responsive to a request for recording a data unit with respect to said item, said record control means produces a new record including said requested data unit and stores the new record into said data file, and further stores a change bit into said index file, said change bit representing whether said requested data unit in the new record differs from a data unit stored immediately before with respect to said item.

5. The data managing apparatus according to claim 4, further comprising means for defining a relationship between information units for identifying the records stored in said data file and time information units, wherein one of said records is identified based on corresponding one of said time information units.

6. A data managing apparatus comprising:

a data file storing records each of which includes at least one item having a corresponding data unit, said data units subject, to a predetermined sequence;

an index file associated with said item and storing change bits representing whether the data units of said item have been changed in said predetermined sequence; and read control means for controlling reading from said data file and said index file, wherein, responsive to a retrieval request for a record whose data unit with respect to said item has been changed in contents, said read control means identifies the requested record based on the change bits stored in said index file.

7. The data managing apparatus according to claim 6, further comprising means for defining a relationship between information units for identifying the records stored in said data file and time information units, wherein one of said records is identified based on corresponding one of said time information units.

8. A computer-readable recording medium storing a program which causes a computer to execute the steps of:

forming a data file for storing records each of which includes at least one item for a corresponding data unit, said data units subject to a predetermined sequence;

forming an index file associated with said item;

producing, responsive to a request for recording a data unit with respect to said item, a new record including said requested data unit;

storing the new record into said data file; and storing a change bit into said index file, said change bit representing whether said requested data unit in the new record differs from a data unit stored immediately before with respect to said item.

9. A computer-readable recording medium storing a program which causes a computer to execute the steps of:

forming a data file storing records each of which includes at least one item having a corresponding data unit, said data units subject to a predetermined sequence;

forming an index file associated with said item and storing change bits representing whether the data units of said item have been changed in said predetermined sequence;

referring, responsive to a retrieval request for a record whose data unit with respect to said item has been changed in contents, to the change bits stored in said index file; and identifying the requested record based on said referred change bits.

* * * * *